(12) United States Patent
Sjöberg et al.

(10) Patent No.: US 7,437,415 B2
(45) Date of Patent: Oct. 14, 2008

(54) METHOD OF TRANSFERRING DATA BETWEEN DIFFERENT TYPES OF COMPUTER SYSTEMS BY USING A PRINTER FILE

(75) Inventors: Hans Håkan Sjöberg, Haninge (SE); Kim Neel Wyon, Frederiksberg (DK)

(73) Assignee: Flinders Aps, Frederiksberg (DK)

( * ) Notice: Subject to any disclaimer, the term of this patent is extended or adjusted under 35 U.S.C. 154(b) by 292 days.

(21) Appl. No.: 10/499,575

(22) PCT Filed: Dec. 23, 2002

(86) PCT No.: PCT/SE02/02450

§ 371 (c)(1), (2), (4) Date: Nov. 29, 2004

(87) PCT Pub. No.: WO03/056438

PCT Pub. Date: Jul. 10, 2003

(65) Prior Publication Data

US 2005/0086381 A1    Apr. 21, 2005

Related U.S. Application Data

(60) Provisional application No. 60/344,101, filed on Dec. 28, 2001.

(30) Foreign Application Priority Data

Dec. 21, 2001   (SE)   .................................... 0104414

(51) Int. Cl.
*G06F 15/16* (2006.01)
*G06F 17/00* (2006.01)
*G06Q 10/00* (2006.01)
*G06F 3/12* (2006.01)

(52) U.S. Cl. ...................... 709/206; 715/235; 358/1.15; 705/1

(58) Field of Classification Search ........................ None
See application file for complete search history.

(56) References Cited

U.S. PATENT DOCUMENTS 5,557,780 A    9/1996   Edwards et al.

(Continued)

FOREIGN PATENT DOCUMENTS

JP    2001154945 A   *   6/2001

*Primary Examiner*—Wen-Tai Lin
(74) *Attorney, Agent, or Firm*—Dilworth & Barrese, LLP.

(57) ABSTRACT

A method is provided for communicating information data between a first application program running on a first computer arrangement (10) and a second application program running on a second computer arrangement (20). The method involves creating, in the first computer arrangement, a transfer file which has a printer file for a digital document containing the information data to be transferred and a definition file defining a relation between a set of information data items contained in the printer file and a set of labels so that each information data item is associated to a label, sending the transfer file from the first computer arrangement to the second computer arrangement and, at the second computer arrangement by way of the definition file, obtaining the information data items contained in the printer file contained in the transfer file for enabling input of the information data items to the second application program. A system for communicating information data between a first application program operable on a first computer arrangement (10) and a second application program operable on a second computer arrangement (20) is also provided.

25 Claims, 1 Drawing Sheet

U.S. PATENT DOCUMENTS

| | | |
|---|---|---|
| 5,794,234 A | 8/1998 | Church et al. |
| 5,812,669 A | 9/1998 | Jenkins et al. |
| 5,878,419 A | 3/1999 | Carter |
| 5,897,645 A | 4/1999 | Watters |
| 6,240,441 B1 * | 5/2001 | Beckett et al. ............... 709/200 |
| 2001/0049666 A1 * | 12/2001 | Prakken et al. ................ 705/59 |
| 2002/0049790 A1 * | 4/2002 | Ricker et al. ................ 707/513 |
| 2002/0184494 A1 * | 12/2002 | Awadalla .................... 713/160 |
| 2003/0197062 A1 * | 10/2003 | Shaw ......................... 235/385 |
| 2004/0128199 A1 * | 7/2004 | Cusack et al. ................. 705/16 |

* cited by examiner

METHOD OF TRANSFERRING DATA BETWEEN DIFFERENT TYPES OF COMPUTER SYSTEMS BY USING A PRINTER FILE

CROSS-REFERENCE TO RELATED APPLICATION(S)

The present application is a national phase application of PCT/SE02/02450 filed Dec. 23, 2002 and which claims priority from Swedish application 0104414.8 filed Dec. 21, 2001 and U.S. provisional application 60/344,101 filed Dec. 28, 2001.

FIELD OF THE INVENTION

The present invention is related to a method for communicating information data between a first application program running on a first computer arrangement and a second application program running on a second computer arrangement. The invention is also related to a system, comprising a first computer arrangement, a first application program runable on the first computer arrangement, a second computer arrangement and a second application program runable on the second computer arrangement, for communicating information data between said first and second application programs.

BACKGROUND OF THE INVENTION AND PRIOR ART

In order to manage important parts of the business of a company, an organisation or the like, the use of so-called business financial systems is increasing. The term "business financial system" as used in this specification refers to a system, preferably a multi-module application software, for managing important parts of the business of a company, an organisation or the like. However, for reasons of simplicity, only companies will be mentioned hereinafter. Thus, it is to be understood that whenever "company" is mentioned, any other kind of organisation is also applicable. The important parts of the business managed by an business financial system may for instance include, but are not limited to, product planning, parts purchasing, managing inventories, interacting with suppliers, providing customer service, tracking orders, etc. Well-known business financial system providers include SAP, Oracle, J D Edwards and Peoplesoft.

However, all business financial systems are not compatible with each other. That is, data output from one type of business financial system may not always easily be input to another type of business financial system.

Thus, there exists a problem in connecting different business financial systems with each other, i.e. electronic data interchange between different business financial systems is difficult.

For example, a manufacturer may co-operate with a large number of suppliers. If not all suppliers utilize the same business financial system as the manufacturer, there is a problem in interchanging data electronically between the business financial system of the manufacturer and the business financial system of each supplier.

EDI, Electronic Data Interchange, has been proposed as a standardization of electronic communication of information between different computer systems. Examples of EDI documents that may be transferred electronically between different computer systems include purchase orders, invoices, price quotes, product inquiries and the like. In an EDI document, the information contained therein is arranged according to a standardized format. Thus, in order to make use of EDI, each document to be transferred electronically between two different computer systems has to be converted into the EDI format. For example, if an invoice is to be transferred from a supplier to a customer, the invoice created in the supplier's business financial system has to be converted into EDI format. For the customer's business financial system to understand the information contained in the EDI invoice, the information contained in the EDI invoice has to be converted into a format understandable by the business financial system of the customer.

Accordingly, the use of EDI for transferring documents electronically between different computer systems involves converting documents into EDI format at the document sender and converting documents from EDI format at the document receiver. Thus, if two different business financial systems are to use EDI for data interchange, integration of additional software at each business financial system has to be performed so that the required document conversion may take place. This kind of software integration in order to be able to convert documents is in most cases very costly. Although EDI makes it possible to interchange data between different computer systems, the costs involved with integrating a business financial system with software for document conversion into and from EDI format are large. Especially for smaller companies, such as for instance a smaller supplier, the costs involved with the use of EDI cannot be motivated.

Still, information has to be transferred in some way between different business financial systems. Thus, documents, such as invoices, purchase orders and the like, which are generated by a business financial system, are often printed on paper for delivery to a receiver having another business financial system. To automatize document handling, different data capturing solutions have been proposed. For example, a paper document may be scanned for obtaining important information items contained in the paper document. The information obtained by such data capture may then be input to the receiver's business financial system. However, data capture involving scanning of paper documents is not 100% reliable. Consequently, the data captured in such a manner has to be checked, which is disadvantageous.

As mentioned hereinabove, there exists a need of data interchange between different business financial systems. Large benefits would be reaped for all parts involved if data could be transferred electronically between different business financial systems, compared to the case of manual handling of paper documents containing the data to be transferred.

This becomes especially apparent within the manufacturing industry and the field of transportation. As an illustrative example may be mentioned the process of handling an invoice. Due to the difficulties in transferring invoices electronically, at present a lot of manual work is done in the invoice handling process including printing, enveloping, sending, opening letters, registration, certification, preliminary booking, attestation, payments and archiving. All manual work carried out in this process implies large costs for each part involved.

Various service bureaus, one example of which being The Swedish Post Office, provide services for data interchange including an intermediate part, which interconnects a first and a second part, which are to interchange information data. Information data are sent from the first part to the intermediate part, which performs necessary conversion so that the information data may be received by the second part. Thus, this kind of service provides a means for connecting different business financial systems with each other so that data may be exchanged electronically. However, since all communication goes via an intermediate part, this solution for electronic data interchange is very vulnerable to operational disorders in the computer system of the intermediate part providing this service.

SUMMARY OF THE INVENTION

The object of the present invention is to devise ways for providing data interchange between different computer systems in general and different business financial systems in particular, which way are improved with respect to known solutions in the art described hereinabove. In particular, this invention aims at improving and simplifying the transfer of business documents, such as invoices, purchase orders, price quotes, product inquiries and the like, and data contained therein between different kinds of business financial systems.

According to a first aspect of the present invention, this object is achieved by a method of the initially defined kind, comprising the steps of generating in said first application program a digital document containing the information data to be transferred, creating in said first computer arrangement a printer file for said document, creating in said first computer arrangement a transfer file, which comprises said printer file and a definition file defining a relation between a set of information data items contained in said printer file and a set of labels so that each information data item is associated to a label, sending said transfer file from the first computer arrangement to the second computer arrangement, receiving said transfer file at the second computer arrangement, and at the second computer arrangement by means of said definition file obtaining the information data items contained in the printer file comprised in the transfer file for enabling input of the information data items to the second application program.

In this way, it becomes possible to exchange information data between the first application program in the first computer arrangement and the second application program in the second computer arrangement without having to perform any costly modification of the first application program or the second application program. Furthermore, no extensive or complicated integration of the first or second application program with any additional software is necessary for the desired information data exchange to take place.

According to a preferred embodiment of the present invention the method comprises sending and receiving said transfer file by means of digital distribution.

This allows for a quick and secure transmission of the information data between the first application program in the first computer arrangement and the second application program in the second computer arrangement. Since many computer arrangements often are provided with means for using digital distribution, no additional arrangements have to be provided in order to be able to perform necessary sending and receiving of said transfer file.

According to another preferred embodiment of the present invention the method comprises encrypting said transfer file in the first computer arrangement prior to sending it from the first computer arrangement to the second computer arrangement, and decrypting said transfer file in the second computer arrangement upon receipt thereof.

Hereby, the information data contained in the transfer file is protected during transfer thereof. Furthermore, in this way the information data may not be accessed by anyone except for second computer arrangements being able to perform said decryption, thus providing a high security level.

According to another preferred embodiment of the present invention the method comprises checking in the first computer arrangement prior to sending the transfer file to the second computer arrangement that the information data to be transferred are intended for that particular second computer arrangement.

Increased delivery security as regards delivery of the transfer file is provided by checking that the transfer file is to be transferred to that particular second computer arrangement. Accordingly, administrative savings may be earned in a decrease in costs associated with incorrectly sent information data.

According to another preferred embodiment of the present invention the method comprises checking in the second computer arrangement upon receipt of said transfer file and prior to further processing of the transfer file whether said first computer arrangement is authorized to send transfer files to the second computer arrangement.

This provides for increased security for the second computer arrangement, which receives the transfer file. In addition, costs are decreased by not having to process information data not wanted in the second computer arrangement.

According to another preferred embodiment of the present invention the method comprises generating a confirmation receipt message in the second computer arrangement upon receipt of the transfer file, and sending the confirmation receipt message from the second computer arrangement to the first computer arrangement.

In this way the first computer arrangement is notified as soon as the transfer file has reached the second computer arrangement, which provides for administrative advantages.

According to another preferred embodiment of the present invention the method comprises creating in the second computer arrangement an image file of said digital document by means of the printer file contained in the transfer file upon receipt of the transfer file, and storing said image file in the second computer arrangement.

This enables digital archiving of said digital document as originally generated in the first computer arrangement in an administratively advantageous way. This image file may also be viewed for obtaining the proper context for the information data contained therein.

According to a second aspect of the present invention, this object is achieved by a system of the initially defined kind, in which—said first application program is adapted to generate a digital document containing the information data to be transferred, said first computer arrangement comprises software means adapted to generate a printer file for said document, said first computer arrangement comprises software means adapted to generate a transfer file, which comprises said printer file and a definition file defining a relation between a set of information data items contained in said printer file and a set of labels so that each information data item is associated to a label, said first computer arrangement comprises means for sending said transfer file to the second computer arrangement, that said second computer arrangement comprises means for receiving said transfer file, and the second computer arrangement comprises software means for, by means of said definition file, obtaining the information data items contained in the printer file comprised in the transfer file for enabling input of the information data items to the second application program.

The advantages of the system according to the invention are apparent from the discussion hereinabove with reference to the method according to the invention.

Further advantages, advantageous features and applications of the present invention will be apparent from the following description and the dependent claims.

BRIEF DESCRIPTION OF THE DRAWINGS

With reference to the appended drawings, below follows a specific description of preferred embodiments of the invention cited as examples.

In the drawings.

DETAILED DESCRIPTION OF PREFERRED EMBODIMENTS OF THE INVENTION

As will become evident to persons skilled in the art, features and aspects of the present invention may be implemented by any suitable combination of hardware, software and/or firmware. In accordance with the present invention, a "computer arrangement" may comprise for example, one or more processors, long-term storage devices and short-term storage devices, data buses, and other means necessary for running software, and may also comprise communication means, operating systems, application programs etc. Said storage devices may store electronic data, such as application software, database table's, audio, video etc Furthermore, a "computer arrangement" may consist of a plurality of computer devices, each having one or more of the components mentioned above and being connected to each other, for instance via a local area network or a wide area network such as the Internet. All parts mentioned hereinabove may be of any suitable kind.

Figure 1:
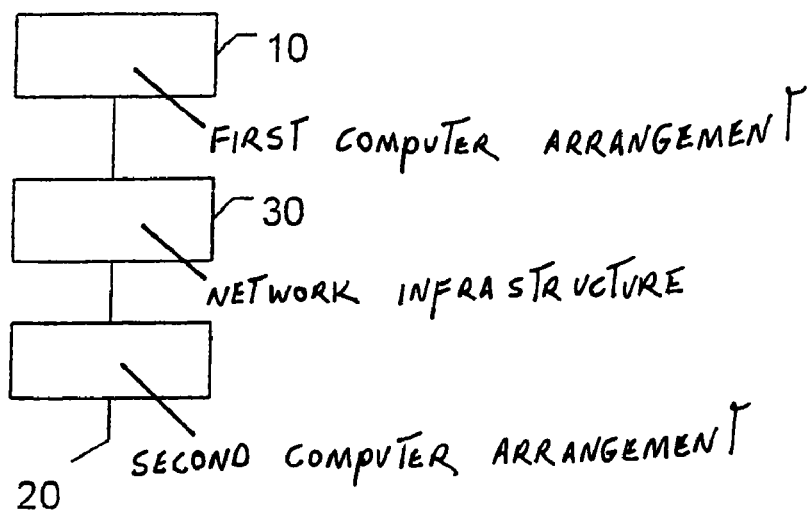
FIG. 1 is a block diagram illustrating a system for communicating information data according to a first preferred embodiment of the invention.

In FIG. 1 is illustrated a system for communicating information data according to a first preferred embodiment of the invention. The system comprises a first computer arrangement, indicated at 10, and a second computer arrangement, indicated at 20. Furthermore, the system comprises a first application program runable on the first computer arrangement and a second application program runable on the second computer arrangement.

According to one preferred embodiment of the present invention the first application program is an business financial system for managing important parts of the business of a first company, such as for instance a supplier type company, and the second application program is an business financial system for managing important parts of the business of a second company, such as a customer type company, which buys items supplied by said first supplier type company. Each of said business financial systems may for instance be a so called ERP (Enterprise Resource Planning) system, but may of course be any kind of business financial system.

Figure 2:
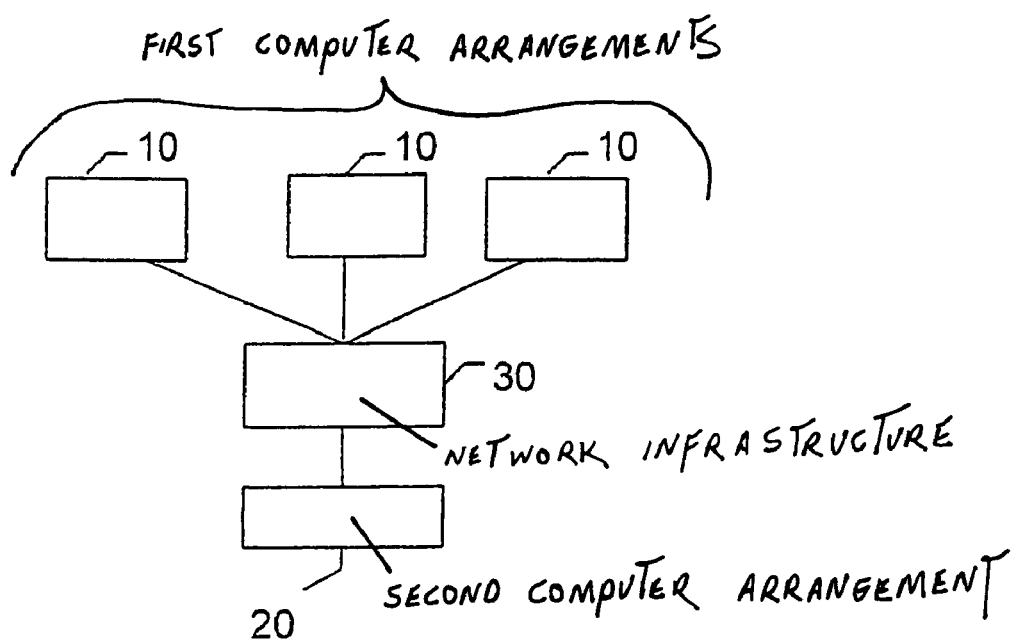
FIG. 2 is a block diagram illustrating a system for communicating information data according to a second preferred embodiment of the invention

In such a supplier/customer situation, each customer usually has a plurality of suppliers. FIG. 2 is a block diagram illustrating a system according to a second preferred embodiment of the invention, comprising a second computer arrangement 20 and a plurality, namely three in this illustrated embodiment, of first computer arrangements 10. Thus, this embodiment is, for example, well suited for such a supplier/customer situation.

When running the first application program on the first computer arrangement, the first application program is capable to generate a digital document containing information data to be transferred from the first application program to the second application program running on the second computer arrangement.

According to a preferred embodiment of the invention, said digital document generated in the first application program in the first computer arrangement, for example an business financial system of a supplier type company, is an invoice, the information data contained therein being intended to be transferred to the second application program in the second computer arrangement, for example an business financial system of a customer type company.

Although the present invention is advantageously applicable to interchange of information data contained in documents such as invoices, it is to be understood that this is by no means limiting the invention in any way. Other conceivable documents containing information data, which may be transferred according to the invention, are for instance purchase orders, price quotes, product inquiries and the like. Many other fields of application will be apparent to a man with ordinary skill in the art, but will not be discussed more in detail herein.

Said first computer arrangement comprises software means for generating a printer file for said digital document. Preferably, said printer file is an operating system printer file. For example, said generated printer file may correspond to a file, which is generated in the operating system installed in said first computer arrangement, under which said first application program is run, for input to a printer device in response to a print command in software running under the operating system.

According to a preferred embodiment of the present invention, the operating system installed in said first computer arrangement is a Microsoft Windows type operating system, but also variants and modifications thereof as well as any other operating system are possible to utilize. Furthermore, according to this embodiment of the present invention, said printer file corresponds to the so called EMF file generated internally in the Windows type operating system as a response to a print command, for instance in the first application program.

The first computer arrangement comprises software means adapted to generate a transfer file, which comprises said printer file and a definition file defining a relation between a set of information data items contained in said printer file and a set of labels so that each information data item is associated to a label.

For example, in the case that said document containing the information data to be transferred is an invoice, said definition file may for instance associate numeric values and/or text contained in said printer file with labels representing one or more of the following items or any other information Customer ID
Customer
Address1
Address2
Zip city
Country
Document type
Attention
Reference
Order no
Line items
Contact
Invoice date
Invoice condition
Product coast
Shipping coast
Extra fee
Discount
Tax
Net amount
VAT
Total amount In other words, the definition file identifies information data items contained in the printer file in order to provide a means by which the information data items can be identified and understood in the second computer arrangement to which the transfer file is to be sent.

For example, the definition file may be generated in the form of a file containing XML (eXtensible Markup Language) code for providing said association between said labels and said information data items. The code included in the definition file may also resemble or be a text file.

Preferably, according to one embodiment of the invention, said digital document generating software means and said printer file generating software means are arranged in one single software application, which is installed and run on said first computer arrangement. For reasons of simplicity, hereinafter this one software application will be referred to as the "supplier software application" in accordance with the previously mentioned embodiment of the invention. However, it is to be understood that the invention is not limited to the supplier/customer relationship, This is only an example given for explanatory purposes.

The supplier software application is preferably arranged so that, after installation thereof in the first computer arrangement, it is possible to choose the supplier software application as an output printer device for all printing operations in the first application program. Hence, it is possible to use existing first application programs in the first computer arrangement, such as for instance business financial systems, including ERP systems, and the like. During installation of the supplier software application preferably a matching procedure takes place, in which the information data items in printer files corresponding to digital documents generated in the first application program are associated to a set of labels as mentioned above, This configuration has only to be made once in order to obtain the proper definition file for inclusion in the transfer file when information data is to be transferred.

Furthermore, the use of the printer file as mentioned above provides a very simple way of generating a hardcopy on paper of the digital document generated in the first computer arrangement, if this should be desired. This is simply done by sending the printer file to a printer device, such as for instance a conventional laser printer or ink jet printer.

The first computer arrangement comprises means for sending said transfer file to the second computer arrangement and the second computer arrangement comprises means for receiving said transfer file. Said sending means and receiving means encompass hardware components as well as software components in the first and second computer arrangement, respectively, required for carrying out necessary sending and receiving operations.

The transfer file may of course be transferred between the first and the second computer arrangement in any suitable way. According to a preferred embodiment of the invention the sending means of the first computer arrangement is adapted to send said transfer file by means of digital distribution and the receiving means of the second computer arrangement is adapted to receive the transfer file sent by means of digital distribution. The digital distribution of the transfer file may be arranged in any suitable way, for instance including, but not at all limited to, direct peer to peer file transfer between the first and second computer arrangement. Another conceivable way of distributing the transfer file from the first to the second computer arrangement is to store the transfer file on a storage medium, such as for instance a floppy disc or compact disc, and transport the storage medium from the first computer arrangement to the second computer arrangement, in which the storage medium is read.

Preferably, the transfer file is transferred by means of electronic mail. This is achieved in that, according to a preferred embodiment of the invention, the sending means of the first computer arrangement is adapted to send said transfer file by means of electronic mail and the receiving means of the second computer arrangement is adapted to receive the transfer file sent by means of electronic mail.

Therefore, the first and second computer arrangements are, preferably, interconnected by means of a network infrastructure, such as for instance the Internet. The network infrastructure is indicated at 30 in FIG. 1 and FIG. 2. In order to accomplish this interconnection, the first and second computer arrangements comprise required network connection devices and software. However, since such devices and software are known in the art, this will not be discussed more in detail.

For example, optional electronic mail software may be utilized in the first and second computer arrangements for providing use of electronic mail via the Internet.

Preferably, the second computer arrangement comprises software means for generating a confirmation receipt message upon receipt of the transfer file and means for sending the confirmation receipt message from the second computer arrangement to the first computer arrangement. The first computer arrangement preferably comprises means for receiving said confirmation receipt message. For example, the confirmation receipt message sending means may be included in the transfer file receiving means and the confirmation receipt message receiving means may be included in the transfer file sending means. According to a preferred embodiment of the invention the means for sending and receiving the confirmation receipt message is provided by the electronic mail software for sending and receiving the transfer file in accordance with the embodiment as discussed above. In such a case, the generating and sending of the confirmation receipt message may take place completely automatically by suitable settings in the electronic mail software. Accordingly, the administrative handling of the information data contained in the transfer file is improved.

Preferably, the confirmation receipt message contains information as regards the transfer file. For instance, this transfer file information may include information as to whether the transfer file is corrupt, i.e. unreadable or unacceptable by the second computer arrangement for some reason.

The second computer arrangement comprises software means for, by means of said definition file, obtaining the information data items contained in the printer file comprised in the transfer file. This enables input of said information data items to the second application program.

For example, in the case of information data contained in an invoice document being transferred from a first application program in the form of an business financial system of a supplier type company to a second application program in the form of an business financial system of a customer type company, the information data contained in the invoice document may be directly input to the business financial system of the customer company upon receipt of the transfer file. A hardcopy on paper of the invoice document is easily generated, if desired, in the same way as in the first computer arrangement, i.e. by inputting the printer file to a printer device. Furthermore, it is possible to electronically store the printer file and the definition file in a database if desired, without further complicated measures having to be taken. According to a preferred embodiment of the invention, the second computer arrangement comprises software means adapted to create an image file of said digital document by means of the printer file contained in the transfer file upon receipt of the transfer file. The term "image file" as used in this description and the following claims refers to a computer readable file, which represents an image. This image file may be created in accordance with any suitable image storage format supported by suitable image file viewing software. One conceivable example is to create an image file according to the PDF (Portable Document Format) format of the printer file contained in the transfer file.

For archiving purposes, the second computer arrangement comprises means for storing said image file. Preferably, said storage means comprises a suitably arranged database.

The second computer arrangement preferably also comprises image file viewing software capable of reading and displaying said image file, Hereby, the image files stored in said storage means may be viewed for putting the information data contained therein into context.

In the case of an invoice document, it is possible in the second computer arrangement to obtain necessary information contained in the printer file comprised in the transfer file for distributing to a confirmation workflow, which does not necessarily have to have access to the business financial system running on the second computer arrangement.

Preferably, according to one embodiment of the invention, said software means for obtaining the information data items contained in the printer file comprised in the transfer file is arranged in a software application, which is installed and run on said second computer arrangement. For reasons of simplicity, hereinafter this software application will be referred to as the "customer software application" in accordance with the previously mentioned embodiment of the invention. As mentioned hereinabove, the invention is by no means limited to the supplier/customer relationship. This is only an example given for explanatory purposes.

During installation of the customer software application, preferably, a configuration of the customer software application takes place comprising a selection procedure. In this selection procedure, it is possible for each individual second computer arrangement to select which information data items contained in printer files comprised in transfer files to obtain for input to said second application program running on the second computer arrangement. This configuration has only to be made once, after which the selected information data items may be automatically obtained from the transfer file upon receipt thereof.

According to a preferred embodiment of the invention the first computer arrangement comprises software means for encrypting said transfer file prior to sending it from the first computer arrangement to the second computer arrangement. This encrypting software means may be provided as a stand-alone application, but preferably it is included in the supplier software application. Hereby, the information data is protected from unauthorized reading thereof during transport, for example. The second computer arrangement comprises software means for decrypting said transfer file upon receipt thereof. Preferably, the decrypting software means is included in the customer software application. By providing a unique encryption for each individual second application program in each second computer arrangement it is ensured that only the second computer arrangement intended to receive the transfer file is able to decrypt and thereby understand the information data contained in the transfer file.

In order to avoid sending of information data to incorrect recipients, said first computer arrangement, preferably, comprises software means for prior to sending the transfer file to the second computer arrangement checking that the information data to be transferred are intended for that particular second computer arrangement. Preferably, the checking software means is adapted to compare at least one of said information data items with a reference data item for the second computer arrangement, which reference data item is provided in said first computer arrangement, as a part of said check. According to a preferred embodiment of the invention, said checking software means is included as a part of the supplier software application.

Preferably, the first computer arrangement may comprise a table of reference items corresponding to each second computer arrangement to which information data is to be communicated. For example, in the case that information data contained in for instance an invoice document is to be transferred from a first application program in the form of an business financial system of a supplier type company to a second application program in the form of an business financial system of a customer type company, the first computer arrangement of the supplier type company comprises a table of reference items corresponding to each second computer arrangement, i.e. corresponding to each customer type company. Preferably, the reference item for each second computer arrangement indicates whether this second computer arrangement is capable of receiving transfer files according to the invention. By comparing at least one information data item contained in the printer file with the reference data item for the second computer arrangement it is ensured that information data contained in transfer files only are sent to second computer arrangements capable of receiving such transfer files.

Furthermore, according to a preferred embodiment of the invention the second computer arrangement comprises software means, preferably included in the customer software application, for upon receipt of said transfer file and prior to further processing of the transfer file checking whether said first computer arrangement is authorized to send transfer files to the second computer arrangement. For instance, in the case of sending the transfer file by means of electronic mail, this may be achieved by checking whether the sender electronic mail address, i.e. the identity of the first computer arrangement sending the transfer file, belongs to a first computer arrangement authorized to send transfer files to the second computer arrangement.

According to a preferred embodiment of the invention said authorization checking software means is adapted to compare at least one of said information data items with a reference data item for the first computer arrangement, which reference data item is provided in said second computer arrangement, as a part of said check. For example, reference data items provided in the second computer arrangement may include a list of names of companies, which are authorized to send information data to the second computer arrangement, for instance belonging to a supplier type company.

Hence, by means of a system according to the present invention, information data contained in a digital document generated in the first application program in the first computer arrangement may be communicated to the second computer arrangement and input to the second application program in a very simple and advantageous manner. That is, two different application programs running on two different computer arrangements may interchange information data without extensive modifications of any of the two application programs.

Accordingly, a system according to the invention makes it possible to use existing first and second application programs in the first and second computer arrangements, respectively, without modification and still be able to interchange information data therebetween. This implies huge cost savings on both the first computer arrangement side and the second computer arrangement side of the system.

In particular, a system according to the invention improves and simplifies the transfer of information data contained in business documents, such as invoices, purchase orders, price quotes, product inquiries and the like, between different kinds of business financial systems. For example, according to the invention it is possible to link all kinds of supplier business financial systems with all kinds of customer business financial systems in a simple, reliable and inexpensive way.

Thus, for instance the invoicing process between a supplier type company and a customer type company may be significantly improved according to the present invention. The ability to interchange data electronically between for different kinds of business financial systems without expensive business financial system modifications or implementation and integration of EDI solutions provides large economic benefits. The information data transfer is quick, thereby minimizing lead times. Furthermore, the manual work associated with printing, enveloping, sending, opening letters, registration, authorization, preliminary booking, and archiving may be decreased to a very large extent since the information data transfer to be accomplished by means of these operations may be performed completely electronically. Also other operations such as attestation and payments will benefit from the advantages provided by the present invention.

The simplification of such an invoicing process enables a more efficient administration, which is advantageous for every part involved in such an invoicing process, i.e. both suppliers and customers.

The invention is of course not restricted to the embodiments described above, but many possibilities to modifications thereof may be envisaged by persons skilled in the art without departing from the scope of the invention as defined in the appended claims.

According to the embodiments described above the information data items, which are contained in the printer file comprised in the transfer file and which are obtained in the second computer arrangement by means of said definition file, are to be input to the second application program. As previously mentioned, these information data items may also be input to a confirmation workflow. It is to be understood that these information data items also may be input to other application programs running on the second computer arrangement. It is also conceivable to transmit these obtained information data items to other application programs running on other computer arrangements than the second computer arrangement.

The invention claimed is:

1. A method for communicating information data between a first application program running on a first computer arrangement (10) and a second application program running on a second computer arrangement (20), comprising the steps of generating in said first application program a digital document containing the information data to be transferred, creating in said first computer arrangement a printer file for said document, wherein said printer file is internally generated in an operating system in response to a print command, creating in said first computer arrangement a transfer file which comprises said printer file and a definition file defining a one-to-one relation between a set of information data items contained in said printer file and a set of labels in said definition file so that each information data item is associated to a label, wherein said definition file is created for exclusive use with said printer file in that said definition file labels characterize only those information data items contained within said printer file, sending said transfer file from the first computer arrangement to the second computer arrangement, receiving said transfer file at the second computer arrangement, and at the second computer arrangement by way of said definition file, obtaining the information data items contained in the printer file comprised in the transfer file for enabling input of the information data items to the second application program, creating in the second computer arrangement an image file of said digital document by way of the printer file contained in the transfer file upon receipt of the transfer file, and storing said image file in the second computer arrangement.

2. A method according to claim 1, wherein said printer file is created as an operating system printer file.

3. A method according to claim 1, comprising the additional steps of sending and receiving said transfer file by digital distribution.

4. A method according to claim 3, comprising the additional steps of sending and receiving said transfer file by electronic mail.

5. A method according to claim 1, comprising the additional steps of encrypting said transfer file in the first computer arrangement prior to sending it from the first computer arrangement to the second computer arrangement, and decrypting said transfer file in the second computer arrangement upon receipt thereof.

6. A method according to claim 1, comprising the additional step of checking in the first computer arrangement prior to sending the transfer file to the second computer arrangement that the information data to be transferred are intended for that particular second computer arrangement.

7. A method according to claim 1, comprising the additional step of checking in the second computer arrangement upon receipt of said transfer file and prior to further processing of the transfer file, whether said first computer arrangement is authorized to send transfer files to the second computer arrangement.

8. A method according to claim 1, comprising the additional steps of generating a confirmation receipt message in the second computer arrangement upon receipt of the transfer file, and sending the confirmation receipt message from the second computer arrangement to the first computer arrangement.

9. The method of claim 1, wherein the first application program is a business financial system for managing parts of business of a first company and the second application program is a business financial system for managing parts of business of a second company.

10. The method of claim 9, wherein the first company is a supplier and second company is a customer purchasing from the first company.

11. The system of claim 1, wherein the first application program is a business financial system for managing parts of business of a first company and the second application program is a business financial system for managing parts of business of a second company.

12. The system of claim 11, wherein the first company is a supplier and second company is a customer purchasing from the first company.

13. A method for communicating information data between a first application program running on a first computer arrangement (10) and a second application program running on a second computer arrangement (20), comprising the steps of
- generating in said first application program a digital document containing the information data to be transferred,
- creating in said first computer arrangement a printer file for said document, wherein said printer file is internally generated in an operating system in response to a print command,
- creating in said first computer arrangement a transfer file which comprises said printer file and a definition file defining a relation between a set of information data items contained in said printer file and a set of labels so that each information data item is associated to a label,
- sending said transfer file from the first computer arrangement to the second computer arrangement,
- receiving said transfer file at the second computer arrangement,
- at the second computer arrangement by way of said definition file, obtaining the information data items contained in the printer file comprised in the transfer file for enabling input of the information data items to the second application program,
- creating in the second computer arrangement an image file of said digital document by way of the printer file contained in the transfer file upon receipt of the transfer file, and
- storing said image file in the second computer arrangement,
  - checking in the first computer arrangement prior to sending the transfer file to the second computer arrangement that the information data to be transferred are intended for that particular second computer arrangement, and
- comparing at least one of said information data items with a reference data item for the second computer arrangement, which reference data item is provided in said first computer arrangement, as a part of said check.

14. A method for communicating information data between a first application program running on a first computer arrangement (10) and a second application program running on a second computer arrangement (20), comprising the steps of
- generating in said first application program a digital document containing the information data to be transferred,
- creating in said first computer arrangement a printer file for said document, wherein said printer file is internally generated in an operating system in response to a print command,
- creating in said first computer arrangement a transfer file which comprises said printer file and a definition file defining a relation between a set of information data items contained in said printer file and a set of labels so that each information data item is associated to a label,
- sending said transfer file from the first computer arrangement to the second computer arrangement,
- receiving said transfer file at the second computer arrangement,
- at the second computer arrangement by way of said definition file, obtaining the information data items contained in the printer file comprised in the transfer file for enabling input of the information data items to the second application program by,
- creating in the second computer arrangement an image file of said digital document by way of the printer file contained in the transfer file upon receipt of the transfer file, and
- storing said image file in the second computer arrangement,
- checking in the second computer arrangement upon receipt of said transfer file and prior to further processing of the transfer file whether said first computer arrangement is authorized to send transfer files to the second computer arrangement, and
- comparing at least one of said information data items with a reference data item for the computer arrangement, which reference data item is provided in said second computer arrangement, as a part of said check.

15. A system, comprising the combination of a first computer arrangement (10), a first application program operable on the first computer arrangement, a second computer arrangement (20) and a second application program operable on the second computer arrangement for communicating information data between said first and second application programs,
- wherein said first application program provides means to generate a digital document containing the information data to be transferred,
- said first computer arrangement comprises software means to generate a printer file for said document, wherein said printer file is internally generated in an operating system in response to a print command,
- said first computer arrangement comprises software means to generate a transfer file which comprises said printer file and a definition file defining a one-to-one relation between a set of information data items contained in said printer file and a set of labels in said definition file so that each information data item is associated to a label, wherein said definition file is created for exclusive use with said printer file in that said definition file labels characterize only those information data items contained within said printer file
- said first computer arrangement comprises means for sending said transfer file to the second computer arrangement,
- said second computer arrangement comprises means for receiving said transfer file, and
- the second computer arrangement comprises
- software means for, by way of said definition file, obtaining the information data items contained in the printer file comprised in the transfer file for enabling input of the information data items to the second application program, said software means further comprising:
- software means to create an image file of said digital document by means of the printer file contained in the transfer file upon receipt of the transfer file, and
- means for storing said image file.

16. A system according to claim 15, wherein said printer file is an operating system printer file.

17. A system according to claim 15, wherein said sending means of the first computer arrangement is arranged to send said transfer file by digital distribution and said receiving means of the second computer arrangement is arranged to receive the transfer file sent by digital distribution.

18. A system according to claim 17, wherein said sending means of the first computer arrangement is arranged to send said transfer file by electronic mail and said receiving means of the second computer arrangement is arranged to receive the transfer file sent by electronic mail.

19. A system according to claim 15, wherein said first computer arrangement comprises software means for encrypting said transfer file prior to sending it from the first computer arrangement to the second computer arrangement and said second computer arrangement comprises software means for decrypting said transfer file upon receipt thereof.

20. A system according to claim 15, wherein said first computer arrangement comprises software means for, prior to sending the transfer file to the second computer arrangement, checking that the information data can be transferred are intended for that particular second computer arrangement.

21. A system according to claim 15, wherein said second computer arrangement comprises software means for, upon receipt of said transfer file and prior to further processing of the transfer file, checking whether said first computer arrangement is authorized to send transfer files to the second computer arrangement.

22. A system according to claim 15, wherein said second computer arrangement comprises software means for generating a confirmation receipt message upon receipt of the transfer file, the second computer arrangement comprises means for sending the confirmation receipt message from the second computer arrangement to the first computer arrangement, and the first computer arrangement comprises means for receiving said confirmation receipt message.

23. The combination of claim 15, wherein said second computer arrangement additionally comprises one or more processors, long-term storage devices and short-term storage devices, data buses and means necessary for running software.

24. A system comprising the combination of a first computer arrangement (10), a first application program operable on the first computer arrangement, a second computer arrangement (20) and a second application program operable on the second computer arrangement for communicating information data between said first and second application programs, wherein said first application program provides means to generate a digital document containing the information data to be transferred, said first computer arrangement comprises software means to generate a printer file for said document, wherein said printer file is internally generated in an operating system in response to a print command, said first computer arrangement comprises software means to generate a transfer file which comprises said printer file and a definition file defining a relation between a set of information data items contained in said printer file and a set of labels so that each information data item is associated to a label, said first computer arrangement comprises means for sending said transfer file to the second computer arrangement, said second computer arrangement comprises means for receiving said transfer file, software means for, by way of said definition file, obtaining the information data items contained in the printer file comprised in the transfer file for enabling input of the information data items to the second application program, said software means further comprising:

software means to create an image file of said digital document by way of the printer file contained in the transfer file upon receipt of the transfer file, and means for storing said image file, said first computer arrangement comprises software means for, prior to sending the transfer file to the second computer arrangement, checking that the information data can be transferred are intended for that particular second computer arrangement, and said checking software means providing means to compare at least one of said information data items with a reference data item for the second computer arrangement, which reference data item is provided in said first computer arrangement as a part of said check.

25. A system comprising the combination of a first computer arrangement (10), a first application program operable on the first computer arrangement, a second computer arrangement (20) and a second application program operable on the second computer arrangement for communicating information data between said first and second application programs, wherein said first application program provides means to generate a digital document containing the information data to be transferred, said first computer arrangement comprises software means to generate a printer file for said document, wherein said printer file is internally generated in an operating system in response to a print command, said first computer arrangement comprises software means to generate a transfer file which comprises said printer file and a definition file defining a relation between a set of information data items contained in said printer file and a set of labels so that each information data item is associated to a label, said first computer arrangement comprises means for sending said transfer file to the second computer arrangement, said second computer arrangement comprises means for receiving said transfer file, software means for, by way of said definition file, obtaining the information data items contained in the printer file comprised in the transfer file for enabling input of the information data items to the second application program, said software means further comprising:

software means to create an image file of said digital document by way of the printer file contained in the transfer file upon receipt of the transfer file, and means for storing said image file, said second computer arrangement comprises software means for, upon receipt of said transfer file and prior to further processing of the transfer file, checking whether said first computer arrangement is authorized to send transfer files to the second computer arrangement, and said authorization checking software means providing means to compare at least one of said information data items with a reference data item for the first computer arrangement, which reference data item is provided in said second computer arrangement, as a part of said check.

* * * * *

UNITED STATES PATENT AND TRADEMARK OFFICE
CERTIFICATE OF CORRECTION

PATENT NO. : 7,437,415 B2  Page 1 of 1
APPLICATION NO. : 10/499575
DATED : October 14, 2008
INVENTOR(S) : Sjoberg et al.

It is certified that error appears in the above-identified patent and that said Letters Patent is hereby corrected as shown below:

Title page, item [54] and Col. 1, line 1
In the Title:
change "SYSTEMS BY USING" to --SYSTEMS USING--.

In the claims:
col. 13, line 6 change "system" to --method--;
col. 13, line 11 change "system" to --method--.

In the specification:
col. 4, line 42 change "table's" to --tables--;
col. 4, line 42 change "etc" to --etc.--;
col. 7, line 1 change "city" to --City--.

Signed and Sealed this

Third Day of March, 2009

JOHN DOLL
*Acting Director of the United States Patent and Trademark Office*